United States Patent
Shipp

(10) Patent No.: US 7,487,540 B2
(45) Date of Patent: Feb. 3, 2009

(54) METHOD OF, AND SYSTEM FOR, REPLACING EXTERNAL LINKS IN ELECTRONIC DOCUMENTS

(75) Inventor: Alexander Shipp, Gloucester (GB)

(73) Assignee: MessageLabs Limited, Gloucester (GB)

( * ) Notice: Subject to any disclaimer, the term of this patent is extended or adjusted under 35 U.S.C. 154(b) by 0 days.

(21) Appl. No.: 10/500,958

(22) PCT Filed: Jan. 19, 2004

(86) PCT No.: PCT/GB2004/000212

§ 371 (c)(1),
(2), (4) Date: Aug. 23, 2004

(87) PCT Pub. No.: WO2004/097676

PCT Pub. Date: Nov. 11, 2004

(65) Prior Publication Data

US 2005/0071748 A1 Mar. 31, 2005

(30) Foreign Application Priority Data

Apr. 25, 2003 (GB) .................................. 0309462

(51) Int. Cl.
*G06F 7/00* (2006.01)
*G06F 17/00* (2006.01)
*G06F 11/00* (2006.01)
*G06F 12/14* (2006.01)
*G06F 12/16* (2006.01)
*G06F 15/18* (2006.01)
*G06F 11/30* (2006.01)
*G08B 23/00* (2006.01)
*H04L 9/32* (2006.01)

(52) U.S. Cl. ..................... 726/22; 713/188; 707/103 R; 707/100

(58) Field of Classification Search ........................ None
See application file for complete search history.

(56) References Cited

U.S. PATENT DOCUMENTS 5,781,901 A 7/1998 Kuzma (Continued)

FOREIGN PATENT DOCUMENTS

EP 1 058 199 12/2000

(Continued)

OTHER PUBLICATIONS

Wiegel B Ed Association for Computing Machinery: "Secure External References in Multimedia Email Messages" 3rd ACM Conference on Computer and Communications Security New Dehli. Mar. 14-16, 1996 ACM Conference on Computer and Communications Security, New York, ACM, US vol. Conf. 3, Mar. 14, 1996 pp. 11-18 XP000620973 ISBN: 0-89791-829-0 abstract pp. 1-4.

(Continued)

*Primary Examiner*—Charles Rones
*Assistant Examiner*—Alicia M Lewis
(74) *Attorney, Agent, or Firm*—Nixon & Vanderhye, PC

(57) ABSTRACT

A content scanner for electronic documents such as email scans objects which are the target of hyperlinks within the document. If they are determined to be acceptable, the hyperlinks are replaced by ones pointing to copies of the objects stored on a trusted server.

15 Claims, 3 Drawing Sheets

U.S. PATENT DOCUMENTS

| | | | |
|---|---|---|---|
| 6,298,444 | B1 | 10/2001 | Foss et al. |
| 6,321,242 | B1 | 11/2001 | Fogg et al. |
| 6,381,637 | B1 | 4/2002 | Kamada |
| 6,629,138 | B1* | 9/2003 | Lambert et al. ............. 709/224 |
| 6,701,440 | B1* | 3/2004 | Kim et al. .................... 726/24 |
| 2003/0097591 | A1* | 5/2003 | Pham et al. ................. 713/201 |
| 2004/0073631 | A1* | 4/2004 | Keorkunian et al. ........ 709/219 |
| 2004/0088570 | A1 | 5/2004 | Roberts et al. |
| 2004/0117450 | A1* | 6/2004 | Campbell et al. ........... 709/207 |
| 2004/0177042 | A1* | 9/2004 | Fostick ........................ 705/51 |
| 2004/0243844 | A1* | 12/2004 | Adkins ....................... 713/201 |
| 2005/0055569 | A1 | 3/2005 | Shipp |
| 2005/0071748 | A1 | 3/2005 | Shipp |
| 2005/0086499 | A1* | 4/2005 | Hoefelmeyer et al. ....... 713/188 |
| 2005/0256955 | A1* | 11/2005 | Bodwell et al. ............. 709/224 |

FOREIGN PATENT DOCUMENTS

| | | |
|---|---|---|
| GB | 2 356 474 A | 5/2001 |
| JP | 9-218876 | 8/1997 |
| JP | 2001/034548 | 2/2001 |
| WO | 98/18088 | 4/1998 |
| WO | 00/65483 | 11/2000 |
| WO | 00/68764 | 11/2000 |
| WO | 01/33380 A1 | 5/2001 |
| WO | 01/50344 | 7/2001 |
| WO | 2004/017238 | 2/2004 |
| WO | 2004/097676 | 11/2004 |

OTHER PUBLICATIONS

Greenfield P et al: "Access Prevention techniques for Internet Content Filtering" CSIRIO, DEc. 1999 XP002265027 pp. 7-14 pp. 17-33.
"Look Ahead Filtering of Internet Content" IBM Technical Disclosure Bulleting, IBM Corp, New York, US vol. 40, No. 12 Dec. 1, 1997, p. 143 XP000754118 ISSN: 0018-8689 the whole document.
Montebello et al; "Evolvable Intelligent User Interface for WWW Knowledge-Based Systems"; Database Engineering and Applications Symposium, 1998, Proceedings, Ideas' 98 International Cardiff, UK Jul. 8-10, 1998, Los Alamitos, CA, USA, IEEE Comput, Soc, US, Jul. 8, 1998, pp. 224-233, XP010294640.

* cited by examiner

METHOD OF, AND SYSTEM FOR, REPLACING EXTERNAL LINKS IN ELECTRONIC DOCUMENTS

This application is the U.S. national phase of international application PCT/GB04/00212, filed 19 Jan. 2004, which designated the U.S. and claims priority to GB Application No. 0309462.0, filed 25 Apr. 2003. The entire contents of these applications are incorporated herein by reference.

BACKGROUND AND SUMMARY

The present invention relates to a method of, and system for, replacing external links in electronic documents such as email with links which can be controlled. One use of this is to ensure that email that attempts to bypass email content scanners no longer succeeds. Another use is to reduce the effectiveness of web bugs.

Content scanning can be carried out at a number of places in the passage of electronic documents from one system to another. Taking email as an example, it may be carried out by software operated by the user, e.g. incorporated in or an adjunct to, his email client, and it may be carried out on a mail server to which the user connects, over a LAN or WAN, in order to retrieve email. Also, Internet Service Providers (ISPs) can carry out content scanning as a value-added service on behalf of customers who, for example, then retrieve their content-scanned email via a POP3 account or similar.

One trick which can be used to bypass email content scanners is to create an email which just contains a link (such as an HTML hyperlink) to the undesirable or "nasty" content. Such content may include viruses and other varieties of malware as well as potentially offensive material such as pornographic images and text, and other material to which the email recipient may not wish to be subjected, such as spam. The content scanner sees only the link, which is not suspicious, and the email is let through. However, when viewed in the email client, the object referred to may either be bought in automatically by the email client, or when the reader clicks on the link. Thus, the nasty object ends up on the user's desktop, without ever passing through the email content scanner.

It is possible for the content scanner to download the object by following the link itself. It can then scan the object. However, this method is not foolproof—for instance, the server delivering the object to the content scanner may be able to detect that the request is from a content scanner and not from the end user. It may then serve up a different, innocent object to be scanned. However, when the end-user requests the object, they get the nasty one.

The present invention seeks to reduce or eliminate the problems of embedded links in electronic documents and does so by having the content scanner attempt to follow a link found in an electronic document and scan the object which is the target of the link. If the object is found to be acceptable from the point of view of content-scanning criteria, it is retrieved by the scanner and stored on a local, trusted server which is under the control of the person or organisation operating the invention. The link in the electronic document is adjusted to point at the copy of the object stored on the trusted server rather than the original; the document can then be delivered to the recipient without the possibility that the version received by the recipient differs from the one originally scanned. Note that it does not matter to the principle of the invention whether the linked object is stored on the trusted server before or after it has been scanned for acceptability; if it is stored first and found unacceptable on scanning, the link to it can simply be deleted.

If the object is not found to be acceptable, one or more remedial actions may be taken: for example, the link may be replaced by a non-functional link and/or a notice that the original link has been removed and why; another possibility is that the electronic document can be quarantined and an email or alert generated and sent to the intended recipient advising him that this has been done and perhaps including a link via which he can retrieve it nevertheless or delete it. The process of following links, scanning the linked object and replacing it or not with an embedded copy and an adjusted link may be applied recursively. An upper limit may be placed on the number of recursion levels, to stop the system getting stuck in an infinite loop (e.g. because there are circular links) and to effectively limit the amount of time the processing will take.

Thus according to the present invention there is provided a content scanning system for electronic documents such as emails comprising:

a) a link analyser for identifying hyperlinks in document content;

b) means for causing a content scanner to scan objects referenced by links identified by the link analyser and to determine their acceptability according to predefined rules, the means being operative, when the link is to an object external to the document and is determined by the content analyser to be acceptable, to retrieve the external object and modify the document by replacing the link to the external object by one to a copy of the object stored on a trusted server.

The invention also provides a method of content-scanning electronic documents such as emails comprising:

a) using a link analyser for identifying hyperlinks in document content;

b) using a content scanner to scan objects referenced by links identified by the link analyser and to determine their acceptability according to predefined rules, the means being operative, when the link is to an object external to the document and is determined by the content analyser to be acceptable, to retrieve the external object and modify the document by replacing the link to the external object by one to a copy of the object stored on a trusted server.

Thus the content scanner can follow the link, and download and scan the object. If the object is judged satisfactory, a copy of it is stored on the trusted server, and the link to the external object replaced by a link to that copy.

One trick used by spammers is to embody 'web bugs' in their spam emails. These are unique or semi-unique links to web sites—so a spammer sending out 1000 emails would use 1000 different links. When the email is read, a connection is made to the web site, and by finding which link has been hit, the spammer can match it with their records to tell which person has read the spam email. This then confirms that the email address is a genuine one. The spammer can continue to send email to that address, or perhaps even sell the address on to other spammers.

By following every external link in every email that passes through the content scanner, all the web bugs the spammer sends out will be activated. Their effectiveness therefore becomes much reduced, because they can no longer be used to tell which email addresses were valid or not.

BRIEF DESCRIPTION OF THE DRAWINGS

The invention will be further described by way of non-limiting example with reference to the accompanying drawings, in which.

DETAILED DESCRIPTION OF EXAMPLE EMBODIMENTS

Figure 1A:
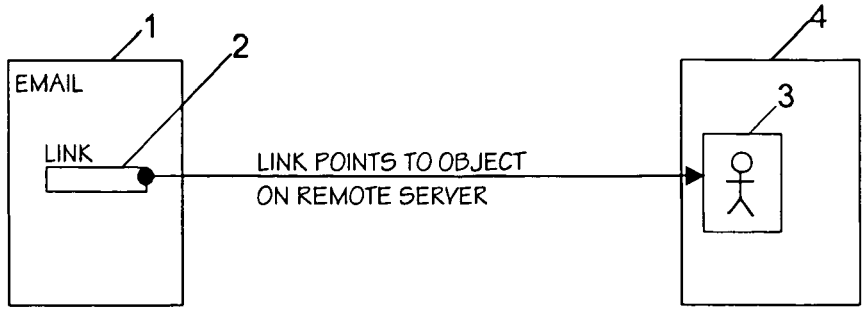
FIGS. 1A and 1B respectively show the "before" and "after" states of an email processed by an embodiment of the present invention.

FIG. 1a shows an email 1 formatted according to an internet (e.g. SMTP/MIME) format. The body includes a hypertext link 2 which points to an object 3 on a web server 4 somewhere on the internet. The object 3 may for example be a graphical image embedded in a web page (e.g. HTML or XML).

Figure 1B:
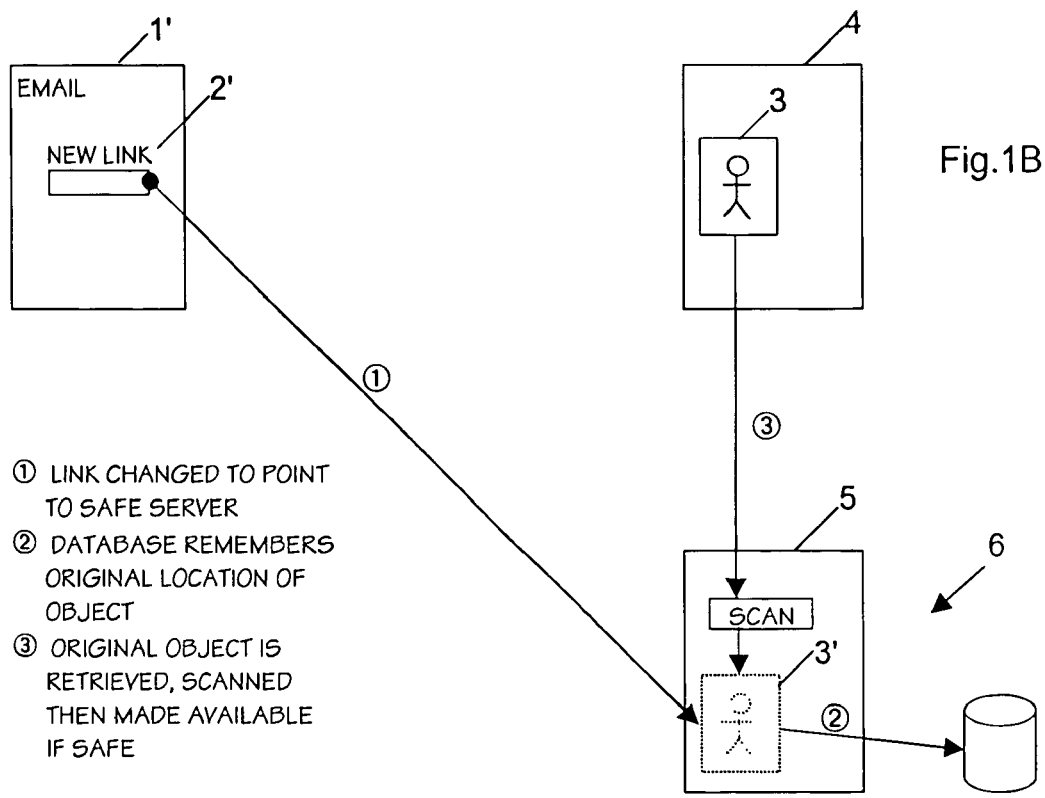

FIG. 1b shows the situation after the email 1' has been processed by the system to be described below and the content pointed at by the link 2 has been judged to be acceptable. The content, i.e. image 3 has been copied to an object server 5 as image 3'; the object server 5 is hosted on a secure server machine 6 (or array of such machines) under the control of the person or organisation operating the system (e.g. an ISP). The original link 2 has been replaced by a new link 2' pointing at the image 3' stored on the secure or trusted server 6. The server 6 operates in the security domain of the operator of the system and has access permissions associated with the stored content objects such as 3' which enable eventual recipients of emails such as 1, or more strictly speaking their email client software to follow the line 2' and retrieve the linked-to object. Of course, the access permissions of server 6 should prevent persons or software without appropriate security credentials from writing to the linked-to object storage area.

Figure 2:
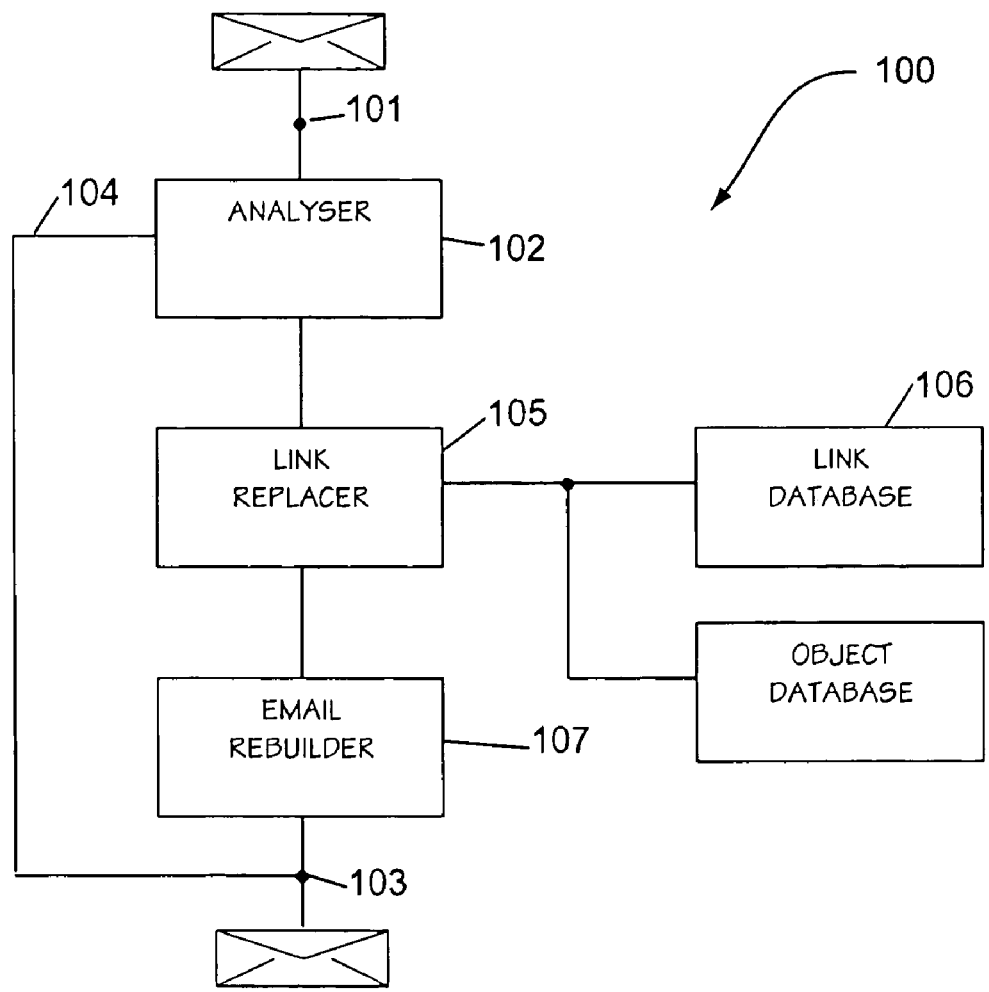
FIG. 2 shows the email processor of a system embodying the present invention.
Figure 3:
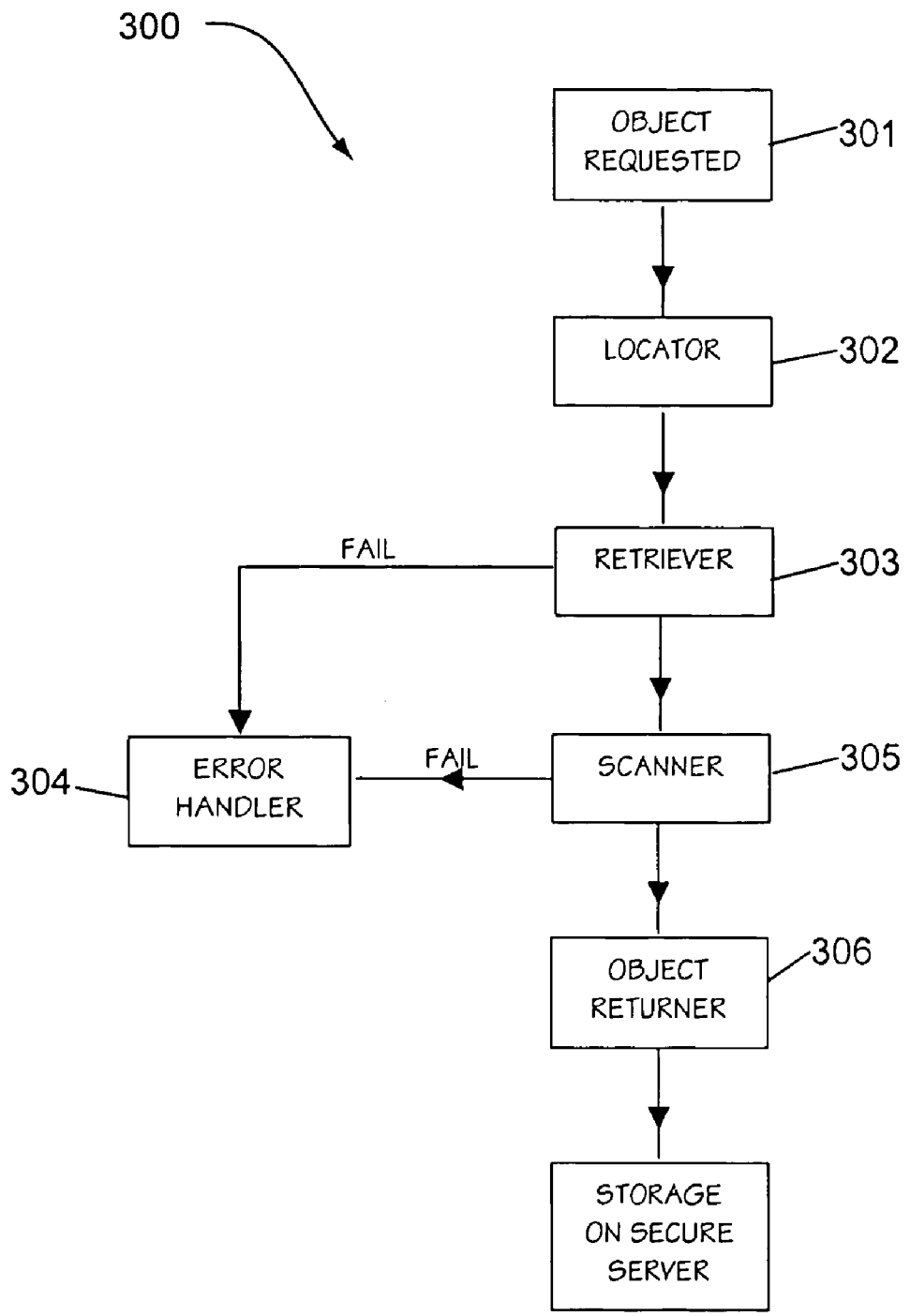
FIG. 3 shows an object server for providing objects referenced by links in email which has been rebuilt by the system of FIG. 2.

FIGS. 2 and 3 illustrate a system according to the present invention. Although the invention is not limited to this application, this example embodiment is given in terms of a content scanner operated by an ISP to process email stream e.g. passing through an email gateway.

FIG. 2 shows the part 100 of the system which processes emails and modifies them to replace links to objects on untrusted servers such as 4 by links to objects on trusted server 6, where the linked-to object is considered to be acceptable content. FIG. 3 shows the object server 300 which provides the linked-to objects when recipients follow the processed links in their emails.

The part 100 of the system which is shown in FIG. 2 may operate as follows in respect of each item of email delivered to an input 101.

1. The email is analysed by analyser 102 to determine whether it contains external links. This determination may be made, for example, by scanning it for standard markup tags which point to external content or objects, for example the <A> and <IMAGE> tags in HTML. If none are found, steps 2 to 5 are omitted and the email is delivered unprocessed to output 103 via path 104.

2. The analyser 102 operates in concert with a link replacer 105 to process links to external objects. For each link, the link replacer 105 creates a new link which is stored in a link database 106. The new link is generated by a process guaranteed to generate unique links each time. A database entry is created, tying the original link and the new, replacement, one together.

3. An email rebuilder 107 rebuilds the email with each link replaced by its new counterpart stored in link database 106 and the rebuilt email is forwarded on.

4. When the email is read, the object server 300 illustrated in FIG. 3 comes into play. The new link may be requested either by the email client software, or by the person reading the email clicking or otherwise selecting the link. This generates a request retrieve an object from the trusted server 6. The server 6 looks up in the link database 106 to find the original object, and retrieves it. If it cannot be retrieved, go to step 8.

5. The external objects are scanned for pornography, viruses, spam and other undesirables. If any are found, go to step 8.

6. The external objects are analysed to see whether they contain external links. If the nesting limit has been reached, go to step 8. Otherwise each external link is replaced by a new link in a manner similar to step 2, and a database entry is created, tying the old and new links together.

7. The rebuilt object is forwarded to the requester, and the process ends

8. If processing arrives here, an undesirable object has been found, or the object could not be retrieved, or the nesting limit has been reached. The system can now take some appropriate error action, such as returning an error message, alerting an operator or returning a default object.

FIG. 3 shows the object server 300 which services requests received at an input 301 to retrieve a linked-to object on an entrusted server, scan it for acceptability and, if acceptable, to store it on the secure "safelink" server 6. An object locator 302 locates the linked-to object, e.g. on the internet and initiates a retrieval operation by which the object is retrieved by the retriever 303. This retrieval process takes place using the internet protocol appropriate to the link and linked-to object. If the retrieval fails, an error handler 304 is invoked. If successful, the object is processed by an object control scanner 305 which makes a determination of whether the content is acceptable. If it is not, the error handler 304 is invoked, otherwise an object returner 306 returns the object and stores it on the trusted server 6.

EXAMPLE

The following email contains a link to a website.

---

Subject: email with link
Subject:
Date: Thu, 9 May 2002 16:17:01 +0600
MIME-Version: 1.0
Content-Type: text/html;
Content-Transfer-Encoding: 7bit
<!DOCTYPE HTML PUBLIC "-//W3C//DTD HTML 4.0 Transitional//EN">
<HTML><HEAD>
</HEAD>
<BODY bgColor=3D#ffffff>
<DIV> </DIV>
This is some text<BR>
<DIV><IMAGE src="http://www.messagelabs.com/threatlist"
</DIV>
This is some more text<BR>
</BODY></HTML>

---

A new link is generated: http://safelink.com/09052002161710a33071ef407.gif, the email is updated, and a database entry is generated.

Database Entry

Old link: http://www.messagelabs.com/threatlist.gif

New link: http://safelink.com/09052002161710a33071ef407.gif

Updated email

```
Subject: email with link
Subject:
Date: Thu, 9 May 2002 16:17:01 +0600
MIME-Version: 1.0
Content-Type: text/html;
Content-Transfer-Encoding: 7bit
<!DOCTYPE HTML PUBLIC "-//W3C//DTD HTML 4.0
Transitional//EN">
<HTML><HEAD>
</HEAD>
<BODY bgColor=3D#ffffff>
<DIV> </DIV>
This is some text<BR>
<DIV><IMAGE src="http://safelink.com/
09052002161710a33071ef407.gif"
</DIV>
This is some more text<BR>
</BODY></HTML>
```

When the email is read, the email client may try and download the image referred to by the link. However, it will try and retrieve the image from http://safelink.com/09052002161710a33071ef407.gif rather than http://www.messagelabs.com/threatlist.gif The safelink.com server will lookup http://safelink.com/09052002161710a33071ef407.gif in the database, and find that the original link is http://www.messagelabs.com/threatlist.gif. It will download the object, and scan it, perhaps for pornography or other inappropriate content.

If the scan shows the object is harmless, it can be passed back to the original requestor.

Example Link Generator

The link can be generated by processing the name of the server generating the link, the current time, the process id, a number that increments each time and random number. This will all be appended to an appropriate reference to the 'safelink' server.

Thus if the server generating the link is mail2071.messagelabs.com, the reference is for the http protocol the time is 27 Jan. 2003, 17:45:01 the process id is 1717, 27 references have already been generated and the safelink server is safelink.com, then a typical link might be:

http://safelink.com/mail2071_messagelabs_com/27012003174501/1717/28/10131354834

Other Improvements

Other improvements can be added to the system. For instance, the system does not have to wait until the object is first requested. It may proactively fetch the object ahead of time, scan it, and either cache the object or remember that the scan did not pass. This will cut down on delays when the object is requested. If all links are followed then this will activate all web bugs placed in the email, thereby much reducing their effectiveness.

The system can also cache and intelligently remember which objects have been retrieved—if five emails contain the same original link, then even though they will end up with five different new links the referred to object only needs to be retrieved once and not five times.

The system might want to ensure the same filename extension is used for the old and new links.

I claim:

1. A content scanning system for electronic documents such as emails comprising:
    a) a link analyser configured to identify hyperlinks in content of electronic documents;
    b) a hyperlink replacer configured to modify the electronic documents by replacing hyperlinks to external objects identified by the link analyser by new hyperlinks to respective targets on a trusted server;
    c) a link database, the hyperlink replacer being configured to store in the link database data relating the replaced hyperlinks to the new hyperlinks; and
    d) an object server hosted on a server machine and configured, on receipt of a request to retrieve an external object from one of said targets on the trusted server when a new hyperlink to said one of said targets is selected, to use the data stored in the link database to determine the replaced hyperlink which was replaced by the new hyperlink, to retrieve the external object referenced by the thus determined, replaced hyperlink, and to cause a content scanner to scan the retrieved external object and to determine the acceptability of the retrieved external object according to predefined rules, the object server being configured, responsive to the replaced hyperlink being to an external object which is determined by the content scanner to be acceptable, to supply the retrieved external object in response to the request, and the object server being configured, responsive to the replaced hyperlink being to an external object which is determined by the content scanner to be unacceptable, to perform remedial action.

2. The system according to claim 1 wherein the link analyser and the object server are configured to recursively process hyperlinks identified in external objects.

3. The system according to claim 2 in which only a maximum depth of recursion is permitted and the document is flagged as unacceptable if that limit is reached.

4. The system according to claim 1 wherein the remedial action comprises one or more of:
    flagging or modifying the document to indicate that the content scanner has found the object to be unacceptable;
    modifying the document by replacing the hyperlink by a non-functional hyperlink; and
    quarantining the document and sending the intended recipient an alert advising the recipient that this has been done.

5. A computer-implemented method of content-scanning electronic documents such as emails comprising:
    a) using a link analyser to identify hyperlinks in content of electronic documents;
    b) modifying the electronic documents by replacing hyperlinks to external objects identified by the link analyser by new hyperlinks to respective targets on a trusted server and storing data relating said replaced hyperlinks to said new hyperlinks;
    c) responsive to a request to retrieve an external object from one of said targets on the trusted server when a new hyperlink to said one of said targets is selected, using the stored data to determine the replaced hyperlink which was replaced by the new hyperlink, retrieving the external object referenced by the thus determined, replaced hyperlink, and using a content scanner to scan the retrieved external object and to determine the acceptability of the retrieved external object according to predefined rules;
    d) responsive to the replaced hyperlink being to an external object which is determined by the content scanner to be acceptable, supplying the retrieved external object in response to the request; and e) responsive to the replaced hyperlink being to an external object which is determined by the content scanner to be unacceptable, performing remedial action.

6. The method according to claim 5 wherein the steps a) through e) are used recursively to process hyperlinks identified in external objects.

7. The method according to claim 6 in which only a maximum depth of recursion is permitted and the document is flagged as unacceptable if that limit is reached.

8. The method according to claim 5, wherein the remedial action comprises one or more of:

flagging or modifying the document to indicate that the content scanner has found the object to be unacceptable;

modifying the document by replacing the hyperlink by a non-functional hyperlink; and quarantining the document and sending the intended recipient an alert advising the recipient that this has been done.

9. The system according to claim 1, wherein the object server is configured, responsive to the replaced hyperlink being to an external object which is determined by the content scanner to be acceptable, further to store the retrieved external object on the trusted server.

10. The method according to claim 5, wherein the step of supplying the retrieved external object in response to the request, responsive to the replaced hyperlink being to an external object which is determined by the content scanner to be acceptable, further comprises storing the retrieved external object on the trusted scanner.

11. A computer-implemented method of content-scanning electronic documents comprising:

a) identifying first hyperlinks in contents of electronic documents;

b) modifying the electronic documents by replacing the identified first hyperlinks with different second hyperlinks which point to a trusted server;

c) storing data to relate the second hyperlinks to the first hyperlinks;

d) in response to a request received by the trusted server when one of the second hyperlinks is selected, using the stored data to determine the first hyperlink corresponding to the selected second hyperlink and retrieving an object using the determined first hyperlink;

e) scanning the retrieved object in accordance with specified rules;

f) making the retrieved object available in response to the received request if the retrieved object is determined to be acceptable in accordance with the specified rules; and g) performing remedial action if the retrieved object is not determined to be acceptable in accordance with the specified rules.

12. The method according to claim 11, further comprising:
generating the second hyperlinks based on one or more of a name of the trusted server, a time, a process identifier, a count that increments for each second hyperlink and a random number.

13. An e-mail gateway comprising a trusted server configured to scan e-mail, the trusted server programmed to perform operations comprising:

a) identifying first hyperlinks in contents of e-mails;

b) modifying the e-mails by replacing the identified first hyperlinks with different second hyperlinks which point to a trusted server;

c) storing data that relates the second hyperlinks to the first hyperlinks;

d) in response to a request received by the trusted server when one of the second hyperlinks is selected, using the stored data to determine the first hyperlink corresponding to the selected second hyperlink and retrieving an object using the determined first hyperlink;

e) scanning the retrieved object in accordance with specified rules;

f) making the retrieved object available in response to the received request if the retrieved object is determined to be acceptable in accordance with the specified rules; and g) performing remedial action if the retrieved object is not determined to be acceptable in accordance with the specified rules.

14. The e-mail gateway according to claim 13, wherein the trusted server is programmed to perform further operations comprising:

identifying a third hyperlink in the retrieved object;

modifying the retrieved object by replacing the identified third hyperlink with a different fourth hyperlink which points to the trusted server; and storing data that relates the fourth hyperlink to the third hyperlink.

15. The e-mail gateway according to claim 14, wherein the trusted server is programmed to perform further operations comprising:

in response to a request received by the trusted server when the fourth hyperlink is selected, using the stored data to determine the third hyperlink corresponding to the selected fourth hyperlink and retrieving another object using the determined third hyperlink;

scanning the retrieved other object in accordance with specified rules;

making the retrieved other object available in response to the received request if the retrieved other object is determined to be acceptable in accordance with the specified rules; and performing remedial action if the retrieved other object is not determined to be acceptable in accordance with the specified rules.

* * * * *